US008931052B2

(12) United States Patent
Jang et al.

(10) Patent No.: US 8,931,052 B2
(45) Date of Patent: Jan. 6, 2015

(54) OPERATION OF MOBILE DEVICE AS TRUSTED MOBILE WEB CLIENT OR TRUSTED MOBILE WEB SERVER

(71) Applicant: Samsung Electronics Co., Ltd., Suwon-Si, Gyeonggi-Do (KR)

(72) Inventors: Won-Churl Jang, Seoul (KR); Myung-Hee Kang, Seoul (KR); Dong-Jin Park, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 88 days.

(21) Appl. No.: 13/714,786

(22) Filed: Dec. 14, 2012

(65) Prior Publication Data
US 2013/0254842 A1 Sep. 26, 2013

(30) Foreign Application Priority Data

Mar. 21, 2012 (KR) .......................... 10-2012-0028689

(51) Int. Cl.
*H04L 29/06* (2006.01)
*H04W 12/06* (2009.01)
(52) U.S. Cl.
CPC ............ *H04L 63/08* (2013.01); *H04L 63/0884* (2013.01); *H04W 12/06* (2013.01)
USPC ........................................................... 726/3
(58) Field of Classification Search
CPC .... H04L 63/0884; H04L 63/08; H04W 12/06
USPC ................................................................ 726/3
See application file for complete search history.

(56) References Cited

U.S. PATENT DOCUMENTS

| 7,950,020 | B2 | 5/2011 | Sun et al. | |
|---|---|---|---|---|
| 2006/0230030 | A1* | 10/2006 | Volpa et al. | 707/3 |
| 2008/0155664 | A1* | 6/2008 | Lieber | 726/5 |
| 2008/0216153 | A1* | 9/2008 | Aaltonen et al. | 726/3 |
| 2010/0330976 | A1 | 12/2010 | Berna Fornies et al. | |
| 2013/0042295 | A1* | 2/2013 | Kelly et al. | 726/1 |

FOREIGN PATENT DOCUMENTS

| KR | 100879583 | 1/2009 |
|---|---|---|
| KR | 1020090128364 A | 12/2009 |
| KR | 1020100018291 A | 2/2010 |
| KR | 1030749 | 4/2011 |

* cited by examiner

*Primary Examiner* — Kambiz Zand
*Assistant Examiner* — Aubrey Wyszynski
(74) *Attorney, Agent, or Firm* — Volentine & Whitt, PLLC

(57) ABSTRACT

A method of operating a mobile device comprises executing a trusted service application in a trusted operating system through secure access, executing a trusted web server module in the trusted operating system, wherein the trusted web server module is configured to transfer information using an internet protocol and the information is generated by execution of the trusted service application, and executing a user application in a rich operating system through normal access, wherein the user application is configured to relay communication between a remote web server and the trusted web server module through a security session.

20 Claims, 18 Drawing Sheets

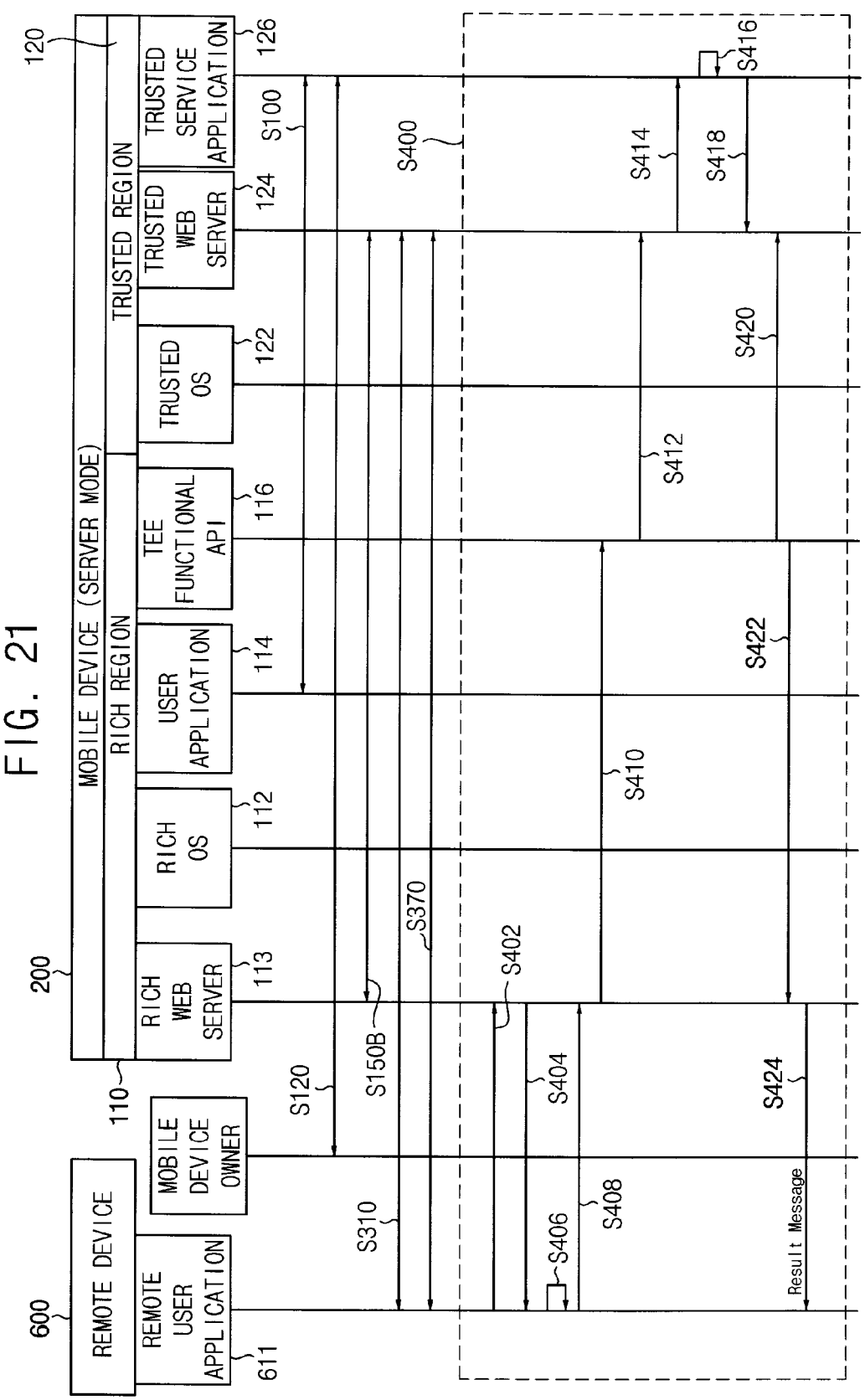

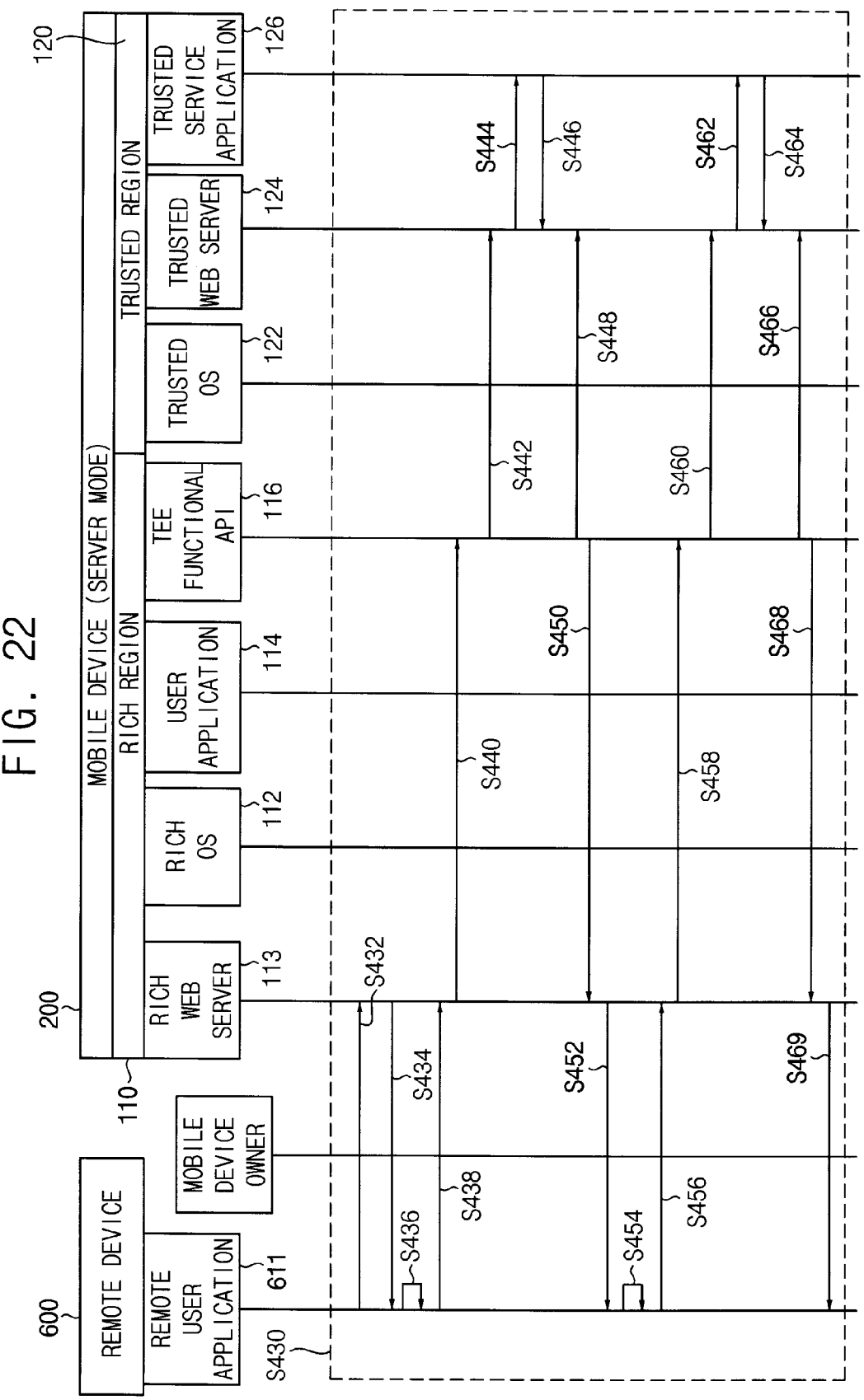

OPERATION OF MOBILE DEVICE AS TRUSTED MOBILE WEB CLIENT OR TRUSTED MOBILE WEB SERVER

CROSS-REFERENCE TO RELATED APPLICATIONS

This application claims priority under 35 USC §119 to Korean Patent Application No. 10-2012-0028689 filed on Mar. 21, 2012, the subject matter of which is hereby incorporated by reference.

BACKGROUND OF THE INVENTION

The inventive concept relates generally to electronic communication. More particularly, certain embodiments of the inventive concept relate to methods of operating a mobile device as a trusted mobile web client system or a trusted mobile web server system to exchange information between a mobile device and a remote device in a secured fashion.

Mobile electronic devices commonly use wireless communication to perform various private transactions. For example, smart phones and tablet personal computers (PCs) are often used to perform financial transactions, mobile shopping, and mobile information searches, to name but a few.

To provide security for these transactions, mobile devices often include various forms of software and/or hardware for protecting access to secured data or other resources. Examples of security mechanisms include password protection, secured communication interfaces, and many others. Due to the small size and unique interfaces of many mobile devices, certain conventional security features such as user password entry may be difficult to implement in these devices. In addition, certain hardware mechanisms, such as smartcard interfaces, may be expensive and cumbersome to operate.

In view of these and other potential shortcomings of conventional technologies, there is a general need for improved forms of security in mobile electronic devices.

SUMMARY OF THE INVENTION

In one embodiment of the inventive concept, a method of operating a mobile device comprises executing a trusted service application in a trusted operating system through secure access, executing a trusted web server module in the trusted operating system, wherein the trusted web server module is configured to transfer information using an internet protocol and the information is generated by execution of the trusted service application, and executing a user application in a rich operating system through normal access, wherein the user application is configured to relay communication between a remote web server and the trusted web server module through a security session.

In another embodiment of the inventive concept, a method of operating a mobile device comprises executing a trusted service application in a trusted operating system through secure access, executing a trusted web server module in the trusted operating system, wherein the trusted web server module is configured to transfer information using an internet protocol and the information is generated by executing the trusted service application, executing a user application in a rich operating system through normal access, and executing a rich web server module in the rich operating system, wherein the rich web server module is configured to relay communication between a remote device and the trusted web server module through a security session.

In yet another embodiment of the inventive concept, a mobile device comprises a trusted operating system configured to execute a trusted service application through secure access, and further configured to execute a trusted web server module, wherein the trusted web server module is configured to transfer information using an internet protocol and the information is generated by execution of the trusted service application, and a rich operating system configured to execute a user application through normal access, wherein the user application is configured to relay communication between a remote web server and the trusted web server module through a security session.

These and other embodiments of the inventive concept can potentially improve the security of mobile devices without significantly diminishing device performance or compatibility.

BRIEF DESCRIPTION OF THE DRAWINGS

The drawings illustrate selected embodiments of the inventive concept. In the drawings, like reference numbers indicate like features.

FIG. 21 is a message sequence diagram illustrating a process of uploading data provided from a remote device to a trusted region of a mobile device according to an embodiment of the inventive concept.

FIG. 22 is a message sequence diagram illustrating a process of downloading data stored in a trusted region of a mobile device to a remote device according to an embodiment of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, the terms first, second, third, etc., may be used to describe various features, but the described features should not be limited by these terms. Rather, these terms are used merely to distinguish one feature from another. Thus, a first feature discussed below could be termed a second feature without materially changing the meaning of the relevant description. As used herein, the term "and/or" indicates any and all combinations of one or more of the associated listed items.

Where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. Other words used to describe the relationship between features should be interpreted in a like fashion (e.g., "between" versus "directly between," "adjacent" versus "directly adjacent," etc.).

The terminology used herein is for the purpose of describing certain embodiments and is not intended to limit the scope of the inventive concept. As used herein, the singular forms "a," "an" and "the" are intended to encompass the plural forms as well, unless the context clearly indicates otherwise. Terms such as "comprises", "comprising," "includes", "including", "having", etc., where used in this specification, indicate the presence of stated features but do not preclude the presence or addition of other features.

In various alternative embodiments, certain functions/operations illustrated in flowcharts or blocks may occur out of the illustrated order. For example, two blocks shown in succession may be executed substantially concurrently or the blocks may be executed in the reverse order, depending upon the functionality/operations involved.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
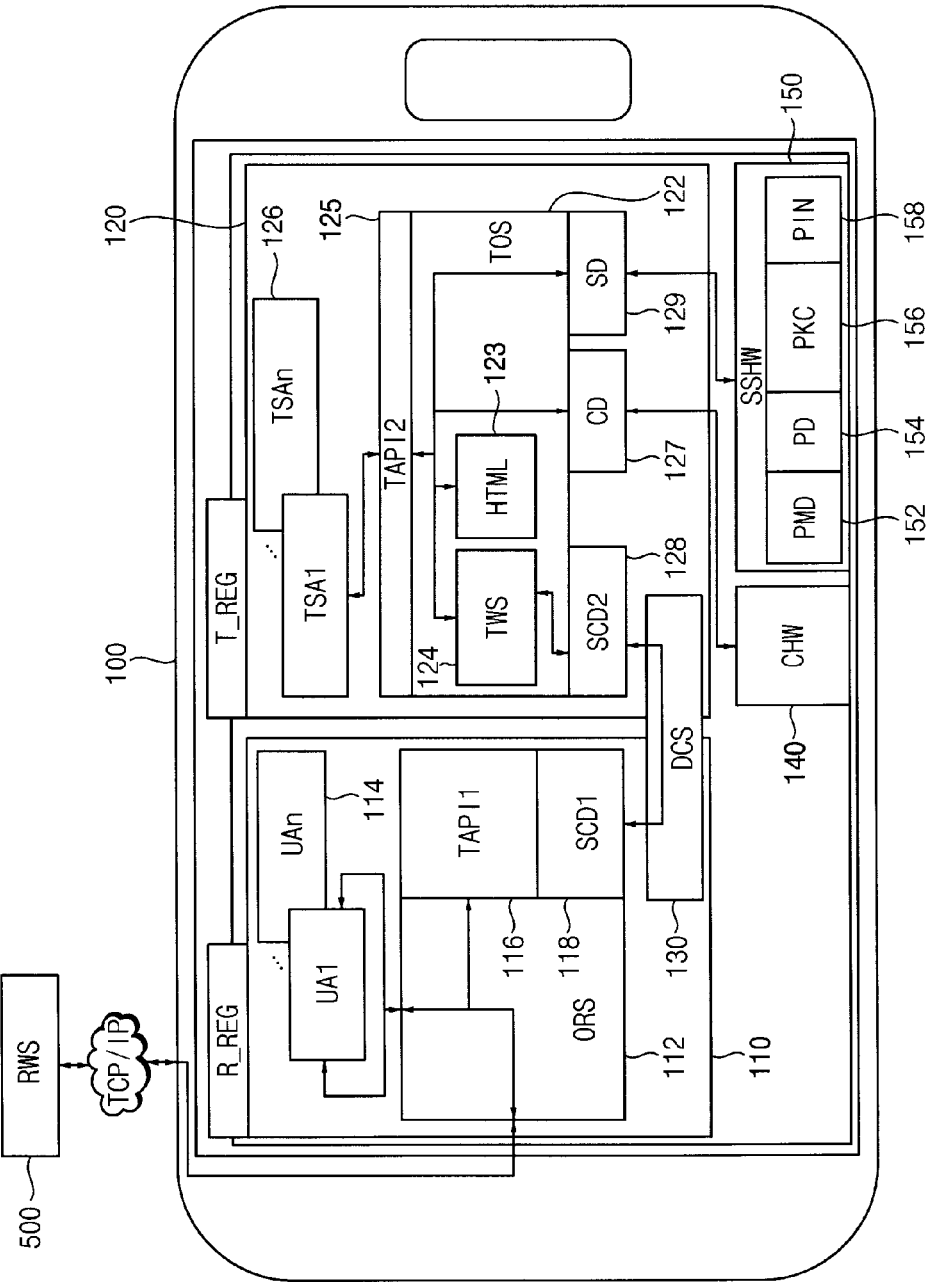
FIG. 1 is a diagram illustrating a mobile device configured to operate as a trusted mobile web client system according to an embodiment of the inventive concept.

FIG. 1 is a diagram illustrating a mobile device 100 configured to operate as a trusted mobile web client system according to an embodiment of the inventive concept.

Referring to FIG. 1, mobile device 100 is coupled to a remote device 500, which is a remote web server (RWS), using a wireless internet communication protocol such as transfer control protocol/internet protocol (TCP/IP). Mobile device 100 may comprise, for instance, a smart phone or a tablet personal computer (PC). It comprises a trusted web server module 124 (TWS) to exchange private data with remote web server 500.

Mobile device 100 comprises a rich region 110 (R_REG) and a trusted region 120 (T_REG). Accordingly, mobile device 100 may operate in a rich environment (or "normal" environment) or in a trusted environment (or "secured" environment).

Rich region 110 is a non-private region in which at least one of multiple user applications 114 (UA1 through UAn) is executed by a rich operating system 112 (ORS) through a normal access. User application 114 may be referred to as trusted client application (TCA). User application 114 relays communication between remote web server 500 and trusted web server module 124 through a security session that is formed as will be described below. Rich operating system 112 may be, for instance, Android, IOS, Bada, Blackberry, Symbian, Linux, or Windows CE.

Trusted region 120 is a private region in which at least one of trusted service applications 126 (TSA1 through TSAn) is executed under a trusted operating system 122 (TOS) through secure access. Trusted region 120 comprises a trusted web server module 124 that links user application 114 and the corresponding trusted service application 126.

Rich region 110 exchanges information and/or data with trusted region 120 through a first application programming interface 116 (TAPI1) that functions to provide a trusted execution environment (TEE). First application programming interface 116 is connected to trusted web server module 124 through a first secure channel driver 118 (SCD1), a domain conversion software 130 (DCS), and a second secure channel driver 128 (SCD2). Accordingly, trusted region 120 is protected from illegal access by malware because rich region 110 accesses trusted region 120 only through first application programming interface 116. Domain conversion software 130 performs a switching operation that determines whether mobile device 100 operates under rich operating system 112 or trusted operating system 122.

Trusted web server module 124 exchanges information and/or data with trusted service application 126 through a second application programming interface (TAPI2) 125 and illegal access through trusted service application 126 may be blocked by second application programming interface 125. Trusted web server module 124 is connected to crypto hardware 140 (CHW) through a crypto driver 127 (CD) and is further connected to secure storage hardware 150 (SSHW) through a storage driver 129 (SD). Secure storage hardware 150 comprises storage regions 152, 154, 156 and 158 for storing private movie data (PMD), other private data (PD), public key certificate data (PKC) and private ID and password (PIN).

Crypto driver 127 supports encryption and decryption of data within trusted region 120. Storage device 129 stores data by encrypting the data using an encryption key that is accessible only in trusted region 120, and it decrypts the stored data using a decryption key that is accessible only in trusted region 120 when the data read request is received from trusted region 120. Trusted web server module 124 supports data communication between user application 114 and trusted service application 126 using an internet protocol such as a hypertext transfer protocol (HTTP) with a hyper text markup language creator 123. Accordingly a system developer may avoid defining an additional communication protocol between user application 114 and trusted service application 126 to allow use of the existing web application in mobile device 100.

Figure 2:
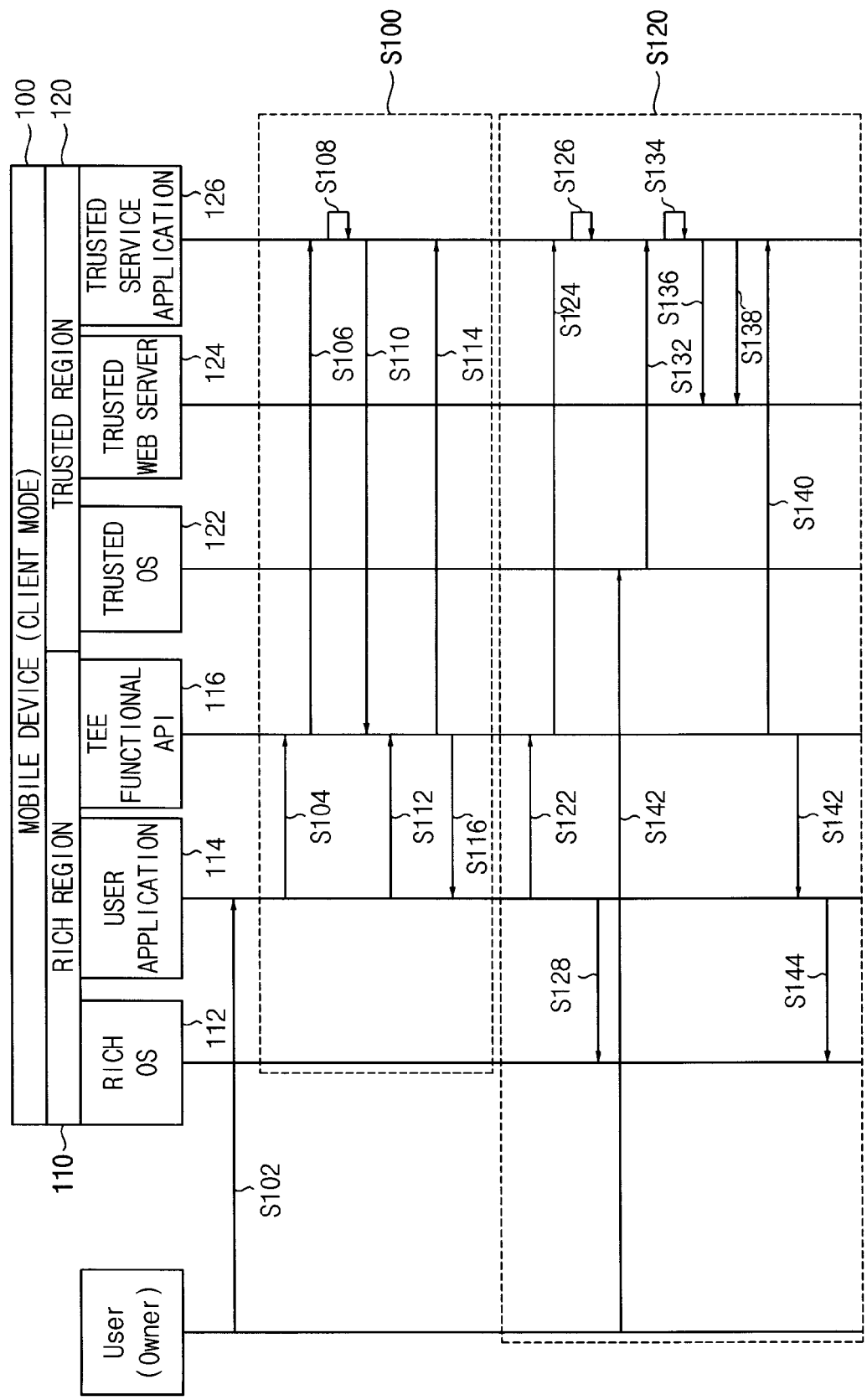
FIG. 2 is a message sequence diagram illustrating a process of initializing a user application and a trusted service application according to an embodiment of the inventive concept.
Figure 3:
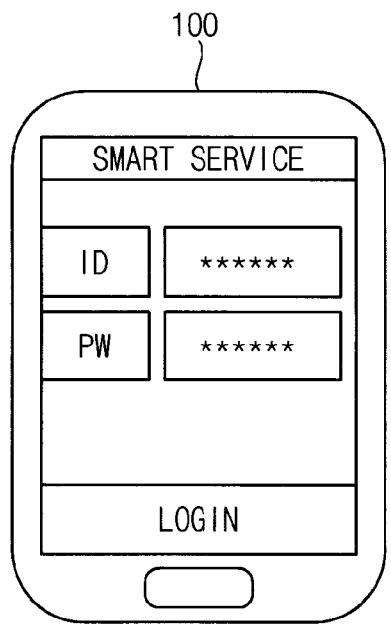
FIG. 3 is a diagram of a display screen showing a login page of a secret user interface according to an embodiment of the inventive concept.
Figure 4:
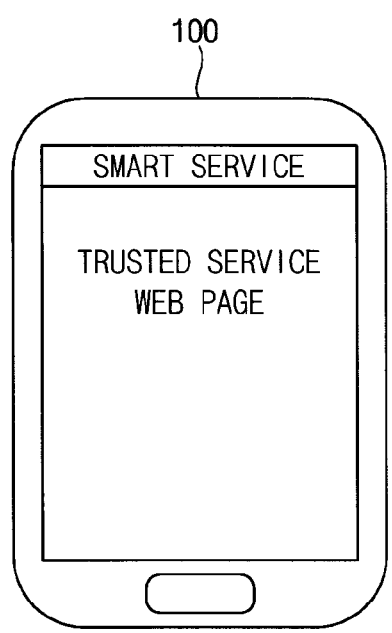
FIG. 4 is a diagram of a display screen showing a web page displayed after the login of FIG. 3 according to an embodiment of the inventive concept.

FIG. 2 is s message sequence diagram illustrating a process of initializing user application 114 and a trusted service application according to an embodiment of the inventive concept. FIG. 3 is a diagram of a display screen showing a login page of a secret user interface and FIG. 4 is a diagram of a display screen showing a web page displayed after the login of FIG. 3.

The user or an owner of mobile device 100 may install user application 114 that is downloaded from a remote web server and then may perform the initialization process as illustrated in FIG. 2 for a secure login. The initialization process generally comprises an application certification negotiation (S100) and a trusted environment login scheme (S120).

User application 114 performs a user certificate procedure for a secure login by registering a user identification and a password in trusted operating system 122 through trusted service application 126 as described below.

Referring to FIG. 2, the application certification negotiation (S100) begins when the user touches a corresponding icon displayed on a touch screen of mobile device 100 to execute user application 114 (S102). User application 114 requests, through TEE functional API 116, a handler of trusted service application 126 (S104) that is to be linked to trusted operating system 122. TEE functional API 116 corresponds to first application programming interface 116 in FIG. 1. When requesting the handler (S104), TEE functional API 116 transfers a unique user identification (UUID) and an electronic signature to trusted operating system 122 to execute trusted service application 126 corresponding to the UUID (S106). Trusted service application 126 checks whether user application 114 is authorized based on the UUID and the electronic signature from user application 114 (S108). When user application 114 is an authorized application, trusted service application 126 returns the handler to TEE functional API 116 (S110) for providing a control handler to user application 114. User application 114 requests resource for pushing secret data to TEE functional API 116 (S112), TEE functional API 116 acquires a write memory address (S114) and transfers the acquired write memory address to user application 114. As such, user application 114 in rich region 110 and trusted service application 126 in trusted region 120 may be linked through the application certification negotiation (S100).

The trusted environment login scheme (S120) begins when user application 114 requests a secure user interface to TEE functional API 116 (S122). TEE functional API 116 transfers the request of the secret user interface to trusted service application 126 (S124). Trusted service application 126 executes the secret user interface (S126) and then a login page of the secret user interface is displayed as a popup window on mobile device 100 through user application 114 (S128) as illustrated in FIG. 3. The user inputs the identification (ID) and the password (PW) through the displayed secret user interface (S142). Trusted operating system 122 transfers the input ID and PW to trusted service application 126 (S132) and trusted service application 126 compares the transferred ID and PW (S134) with the ID and PW stored in storage region 158 of secure storage hardware 150 in FIG. 1. Trusted service application 126 executes trusted web server 124 (S136) and uploads a trusted service web page (S138). TEE functional API 116 acquires a login result message from trusted service application 126 (S140) and transfers the acquired login result message to user application 114 (S142). User application 114 displays the trusted service web page (S144) as the result of the successful login as illustrated in FIG. 4.

In certain embodiments, for safe data transfer, a security session may be formed using an internet protocol based on HTTP between a remote device, that is, a remote web server 500, and trusted web server 124 in mobile device 100 operating in a client mode. Remote web server 500 may provide a web service to mobile device 100 and mobile device 100 may provide private information to remote web server 500 through the security session.

Remote web server 500 forms a transport layer security (TLS) session according to the request from user application 114 in mobile device 100. Also, user application 114 in mobile device 100 forms a security session with trusted web server 124. User application 114 may receive a crypto key from remote web server 500 and transfer the received crypto key to trusted web server 124. Trusted web server 124 may encrypt data using the crypto key provided from user application 114 where trusted web server 124 transfers the data to be open only to remote web server 500. For example, the security session forming process may be performed as illustrated in FIG. 5.

Figure 5:
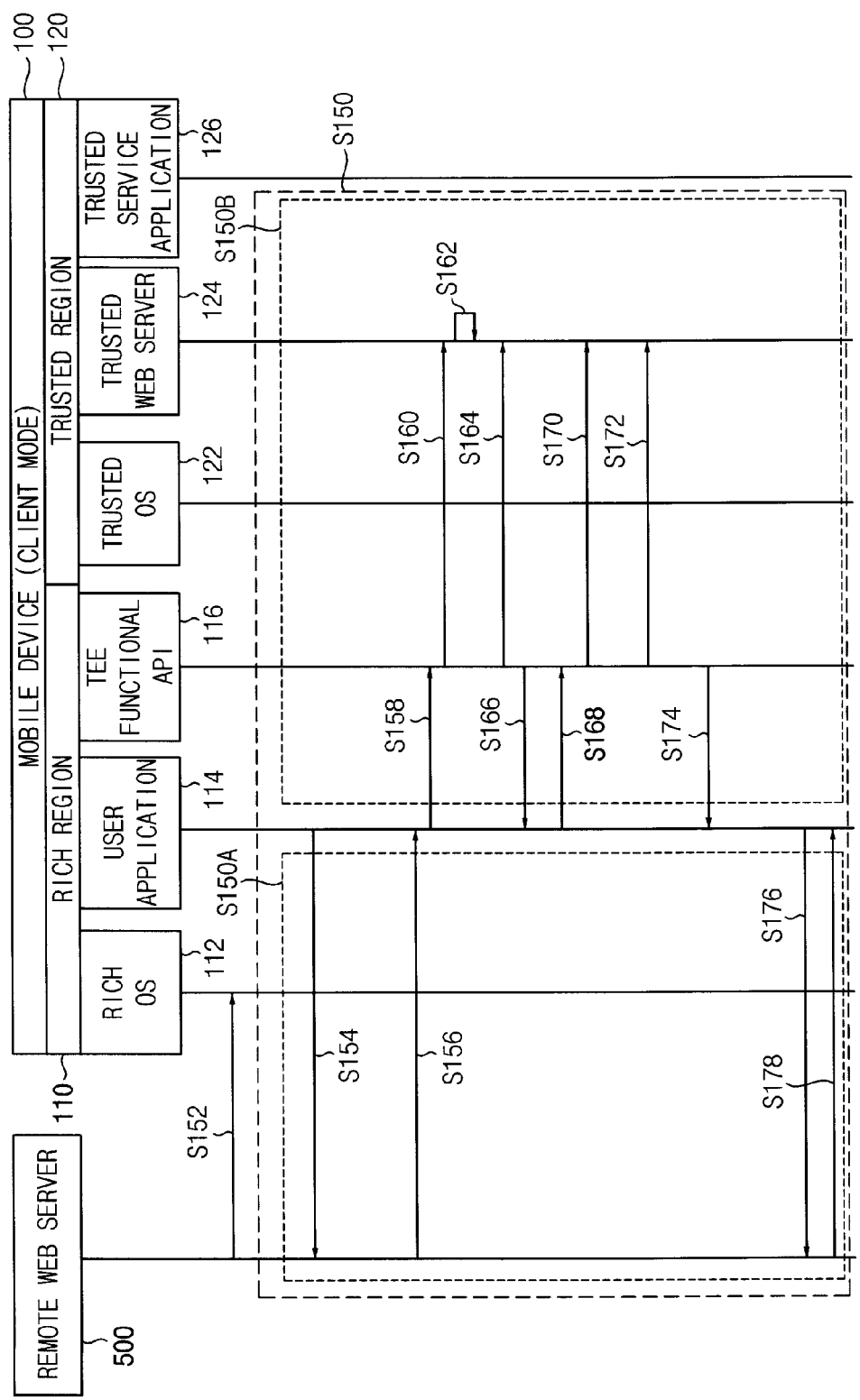
FIG. 5 is a message sequence diagram illustrating a process of forming a security session between a trusted web server and a remote web server according to an embodiment of the inventive concept.

FIG. 5 is a message sequence diagram illustrating a process of forming a security session between a trusted web server and a remote web server according to an embodiment of the inventive concept.

Referring to FIG. 5, a security session forming process (S150) forms a TLS session between remote web server 500 and mobile device 100. The security session forming process (S150) comprises an external session negotiation (S150A) between remote web server 500 and rich region 110 and an internal session negotiation (S150B) between rich region 110 and trusted region 120 in mobile device 100.

Remote web server 500 transfers an 'access service web page' message to rich operating system 112 (S152). User application 114 under rich operating system 112 transfers 'client hello' message to remote web server 500 (S154). Remote web server 500, in response to a 'client hello' message, transfers 'server hello', 'server certificate', 'server key exchange', 'client certificate request' and 'server hello done' messages to user application 114 (S156). User application 114 transfers the 'client hello' message to trusted web server 124 through TEE functional API 116 (S158, S160) and then trusted web server 124 executes the 'server hello', 'server certificate', 'server key exchange', 'client certificate request' and 'server hello done' (S162) messages. TEE functional API 116 acquires 'server security' message from trusted web server 124 (S164) and returns the acquired 'server security' message to user application 114 (S166). User application 114 executes 'client certificate', client key exchange', 'remote server key exchange', 'certificate verify', 'change cipher specification' and 'client finished' messages to store a crypto key in the public key certificate data region 156 of secure storage hardware 150 and transfers generated data and message to TEE functional API 116 (S168). TEE functional API 116 transfers 'client security' message to trusted web server 124 (S170). TEE functional API 116 acquires 'change cipher specification' and 'server finished' messages from trusted web server 124 (S170) and returns the acquired 'change cipher specification' and 'server finished' messages to user application 114 (S174). User application 114 executes the 'client certificate', client key exchange', 'remote server key exchange', 'certificate verify', 'change cipher specification' and 'client finished' messages to transfer the generated data and message to remote web server 500 (S176) and the security session forming process is finished when remote web server 500 transfers 'session finished' message to user application 114 (S178).

In certain embodiments, where a user of mobile device 100 registers at an external website, the registration process may be performed automatically by transferring private information stored in advance in a trusted region 120 of mobile device 100 to the external website, that is, remote web server 500.

Figure 6:
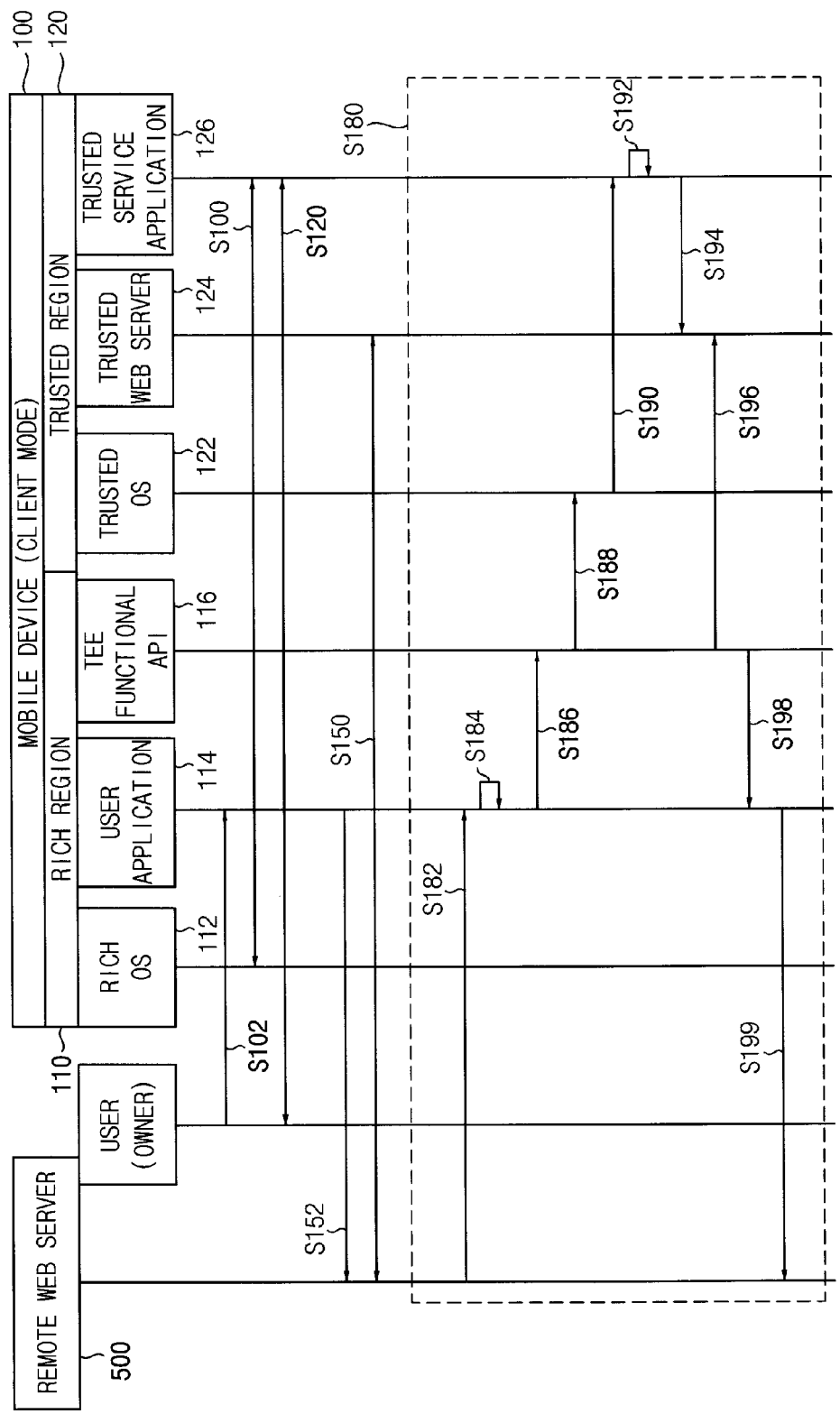
FIG. 6 is a message sequence diagram illustrating a process of registering a user at an external website using private information stored in a trusted region according to an embodiment of the inventive concept.
Figure 8:
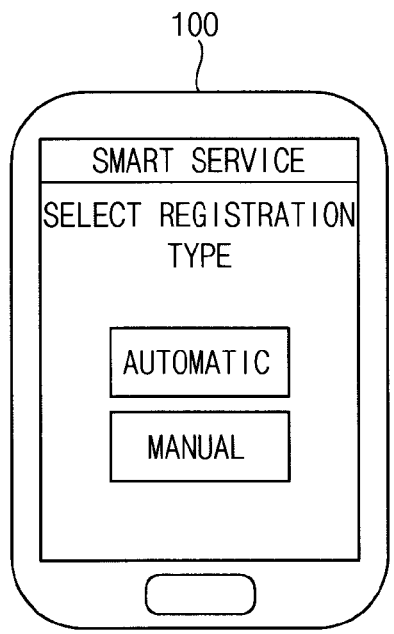
FIG. 8 is a diagram of a display screen showing a selection page of a registration type according to an embodiment of the inventive concept.

FIG. 6 is a message sequence diagram illustrating a process of registering a user at an external website using private information stored in a trusted region according to an embodiment of the inventive concept, and FIG. 8 is a diagram of a display screen showing a selection page of a registration type according to an embodiment of the inventive concept.

Referring to FIG. 6, sequences S102, S100, S120, S152 and S150 are the same as described with reference to FIGS. 2 through 5. In a registering process (S180), remote web server 500, which is authorized by forming the above-described security session through sequences S102, S100, S120, S152 and S150, requests 'create profile web page', that is, a request of registering a new user to user application 114 (S182), and then user application 114 is executed to display a selection page of a registration type (S184) on a screen of mobile device 100 as illustrated in FIG. 8. Where the user selects and touches 'AUTOMATIC' button to select an automatic registration mode, user application 114 transfers 'enrolled profile' request message to TEE functional API 116 (S186). Where the user selects and touches 'MANUAL' button, the user may input necessary information such as a name, a residential address, a social security number, a phone number, etc. using a touchpad or a keypad. TEE functional API 116 transfers 'enrolled profile web page' request message to trusted operating system 122 (S188) and trusted operating system 122 requests the 'enrolled profile web page' to trusted service application 126 (S190). The trusted service application is executed to read private profile data stored in private data region 154 of secure storage hardware 150 in FIG. 1 and encrypt the private profile data using the crypto key (S192). Trusted service application 126 generates the 'enrolled profile web page' including the encrypted private profile data and upload the 'enrolled profile web page' to trusted web server 124 (S194). TEE functional API 116 acquires 'requested profile web page' from trusted web server 124 (S196) and returns the acquired 'requested profile web page' to user application 114 (S198). User application 114 uploads 'creating profile data' based on the 'requested profile web page' to remote web server 500 (S199). That is, trusted web server 124 provides an encrypted user profile in a form of a web page to user application 114, and user application 114 uploads the encrypted user profile to remote web server 500.

As such, the private information may be transferred automatically and safely through the formed security session without the input operation by the user through the keypad.

In certain embodiments, where a user of mobile device 100 performs a login at an external website, the login process may be performed automatically by transferring user identification and password ID/PW stored in advance in a trusted region 120 of mobile device 100 to the external website, that is, remote web server 500.

Figure 7:
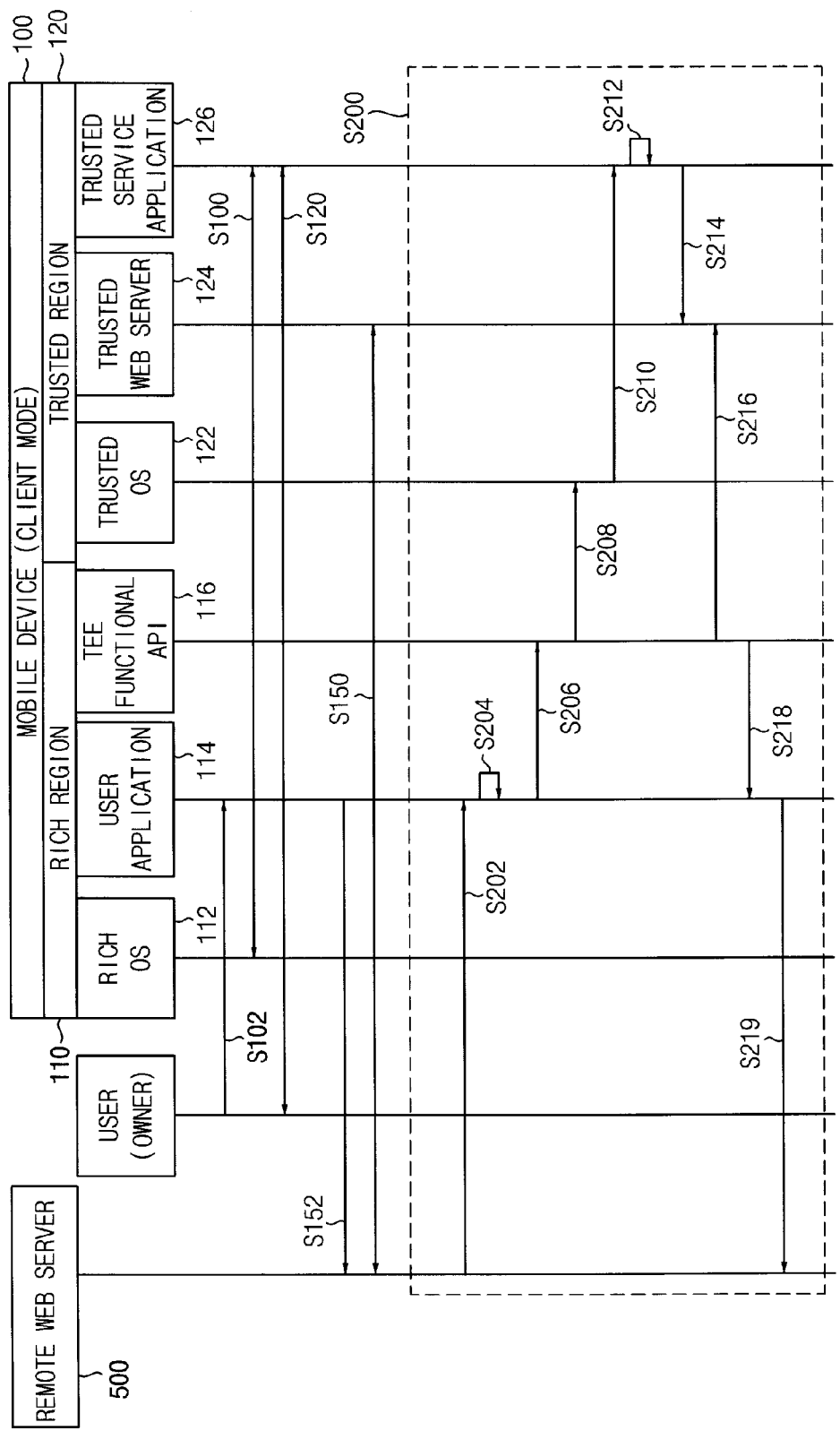
FIG. 7 is a message sequence diagram illustrating a process of performing an automatic login at an external website using a user ID and a password stored in a trusted region according to an embodiment of the inventive concept.
Figure 9:
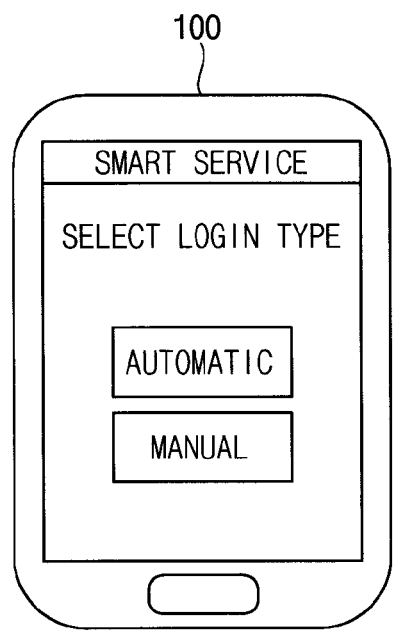
FIG. 9 is a diagram of a display screen showing a selection page of a login type according to an embodiment of the inventive concept.

FIG. 7 is a message sequence diagram illustrating a process of performing an automatic login at an external website using a user ID and a password stored in a trusted region according to an embodiment of the inventive concept, and FIG. 9 is a diagram of a display screen showing a selection page of a login type according to an embodiment of the inventive concept.

Referring to FIG. 7, sequences S102, S100, S120, S152 and S150 are the same as described with reference to FIGS. 2 through 5. In a login process (S200), remote web server 500, which is authorized by forming the above-described security session through sequences S102, S100, S120, S152 and S150, requests 'login web page' to user application 114 (S202), and then user application 114 is executed to display a selection page of a login type (S204) on a screen of mobile device 100 as illustrated in FIG. 9. Where the user selects and touches 'AUTOMATIC' button to select an automatic login mode, user application 114 transfers 'enrolled ID/PW of accessed URL' request message to TEE functional API 116 (S206). The accessed URL may be provided by the input operation of the user. Where the user selects and touches 'MANUAL' button, the user may input ID/PW using a touchpad or a keypad. TEE functional API 116 transfers 'enrolled ID/PW of accessed URL' request message to trusted operating system 122 (S208) and trusted operating system 122 requests the 'enrolled ID/PW' to trusted service application 126 (S210). Trusted service application 126 is execute to check the accessed URL, read the corresponding ID/PW stored in private data region 158 of secure storage hardware 150 in FIG. 1 and encrypt the ID/PW using the crypto key (S212). Trusted service application 126 generates the encrypted 'enrolled ID/PW' and uploads the 'enrolled ID/PW' to trusted web server 124 (S214). TEE functional API 116 acquires 'requested ID/PW' from trusted web server 124 (S216) and returns the acquired 'requested ID/PW' to user application 114 (S218). User application 114 uploads the 'requested ID/PW' to remote web server 500 (S219). As such, the encrypted ID/PW may be transferred automatically and safely through the formed security session without the input operation by the user through the keypad.

In certain embodiments, a user of mobile device 100 may access an external website, that is, a remote web server 500, and may encrypt private data such as movie files, photos, secured documents, electronic signature, etc. to upload the encrypted private data to remote web server 500.

Figure 10:
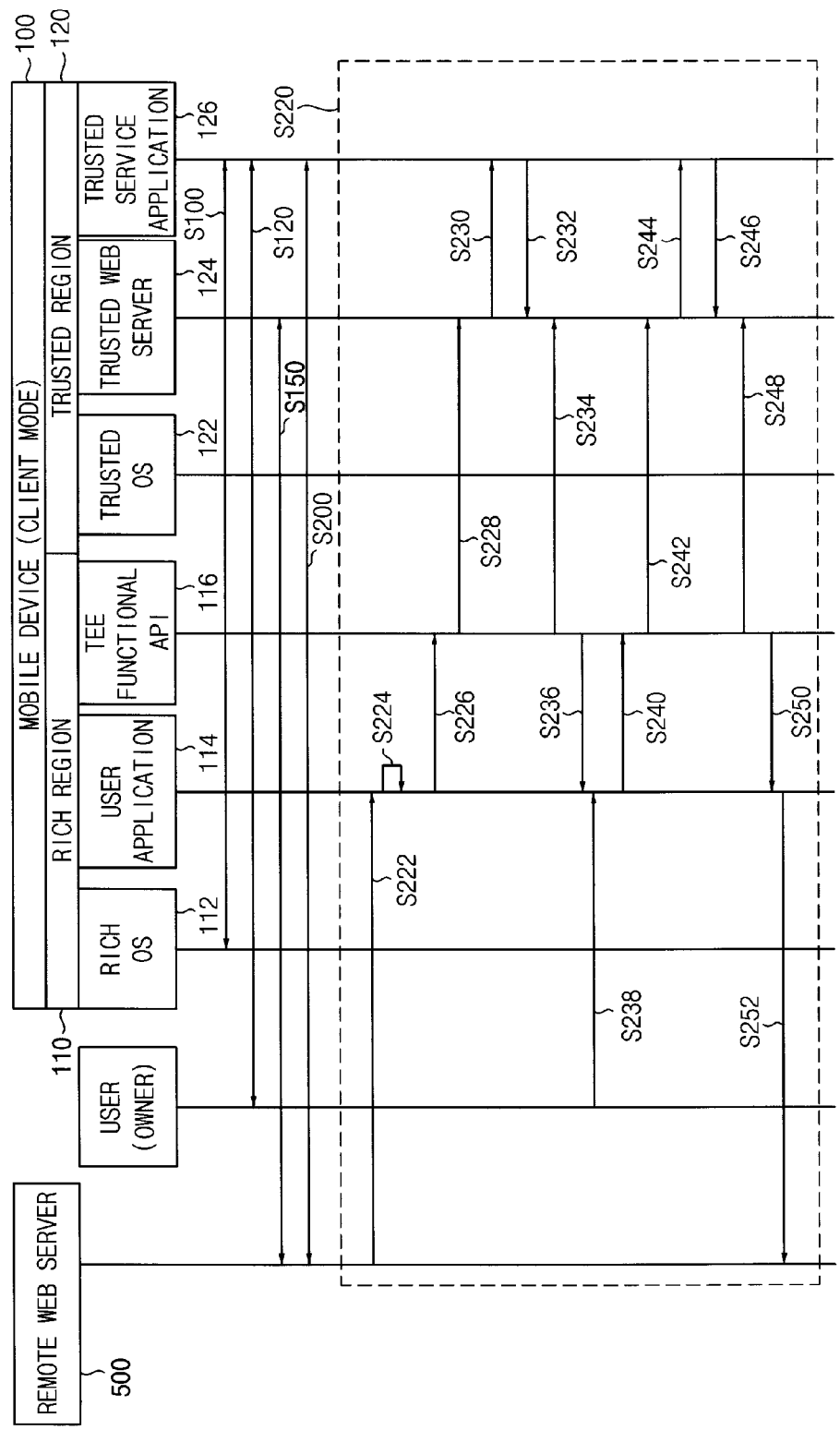
FIG. 10 is a message sequence diagram illustrating a process of uploading data stored in a trusted region of a mobile device to an external website according to an embodiment of the inventive concept.
Figure 11:
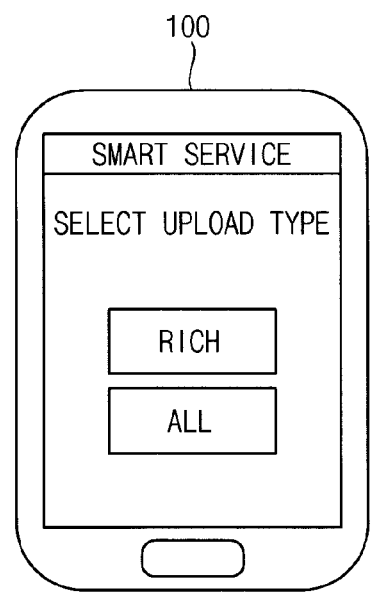
FIG. 11 is a diagram of a display screen showing a selection page of an upload type according to an embodiment of the inventive concept.
Figure 12:
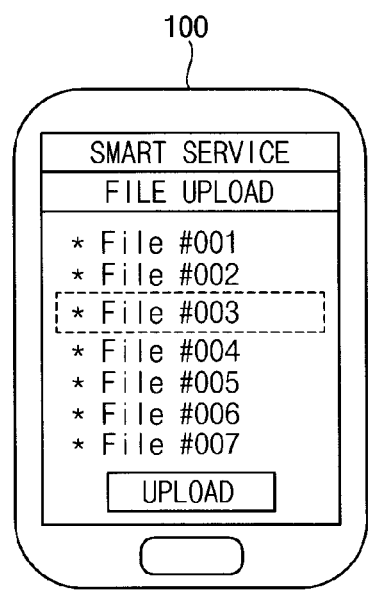
FIG. 12 is a diagram of a display screen showing a selection page of an upload file according to an embodiment of the inventive concept.

FIG. 10 is a message sequence diagram illustrating a process of uploading data stored in a trusted region to an external website according to an embodiment of the inventive concept. FIG. 11 is a diagram of a display screen showing a selection page of an upload type according to an embodiment of the inventive concept. FIG. 12 is a diagram of a display screen showing a selection page of an upload file according to an embodiment of the inventive concept.

Referring to FIG. 10, sequences S100, S120, S150 and S200 are the same as described with reference to FIGS. 2 through 9. In an uploading process (S220), remote web server 500, which is authorized by forming the above-described security session, requests 'data upload web page' to user application 114 (S222), and then user application 114 is executed to display a selection page of an upload type (S224) on a screen of mobile device 100 as illustrated in FIG. 11.

Where the user selects and touches 'ALL' button to select a trusted upload mode, user application 114 requests 'uploadable file list' to TEE functional API 116 (S226). Where the user selects and touches 'RICH' button, the data files stored only in rich region 110 may be selected to be uploaded.

TEE functional API 116 transfers 'request uploadable file list' message to trusted web server 124 (S228) and trusted web server 124 requests the 'uploadable file list' to trusted service application 126 (S230). Trusted service application 126 is executed in response to the 'uploadable file list' request to generate 'requested file list' and upload the 'requested file list' to trusted web server 124 (S232). TEE functional API 116 acquires 'requested file list' from trusted web server 124 (S234) and returns the 'requested file list' to user application 114 (S236). User application 114 displays a selection page of an upload file as illustrated in FIG. 12. The user selects the upload file (S328) on the display screen as illustrated in FIG. 12, and then user application 114 requests 'selected file' to TEE functional API 116 (S240).

TEE functional API 116 transfers 'request selected file' message to trusted web server 124 (S242) and trusted web server 124 requests 'selected file' to trusted service application 126 (S224). Trusted service application 126 is executed to read the selected file from private data region 152 of secure storage hardware 150 in FIG. 1. Trusted service application 126 encrypts the selected file using the crypto key (S212) and uploads the encrypted file to trusted web server 124 (S246). TEE functional API 116 acquires 'requested file' from trusted web server 124 (S248) and returns 'requested file' to user application 114 (S250). User application 114 uploads the encrypted requested file to remote web server 500 (S252).

In certain embodiments, a user of a mobile device may access an external website, that is, a remote web server 500, and may download private data such as movie files, photos, secured documents, electronic signature, etc. from remote web server 500 and store the downloaded data in a trusted region 120 of mobile device 100.

Figure 13:
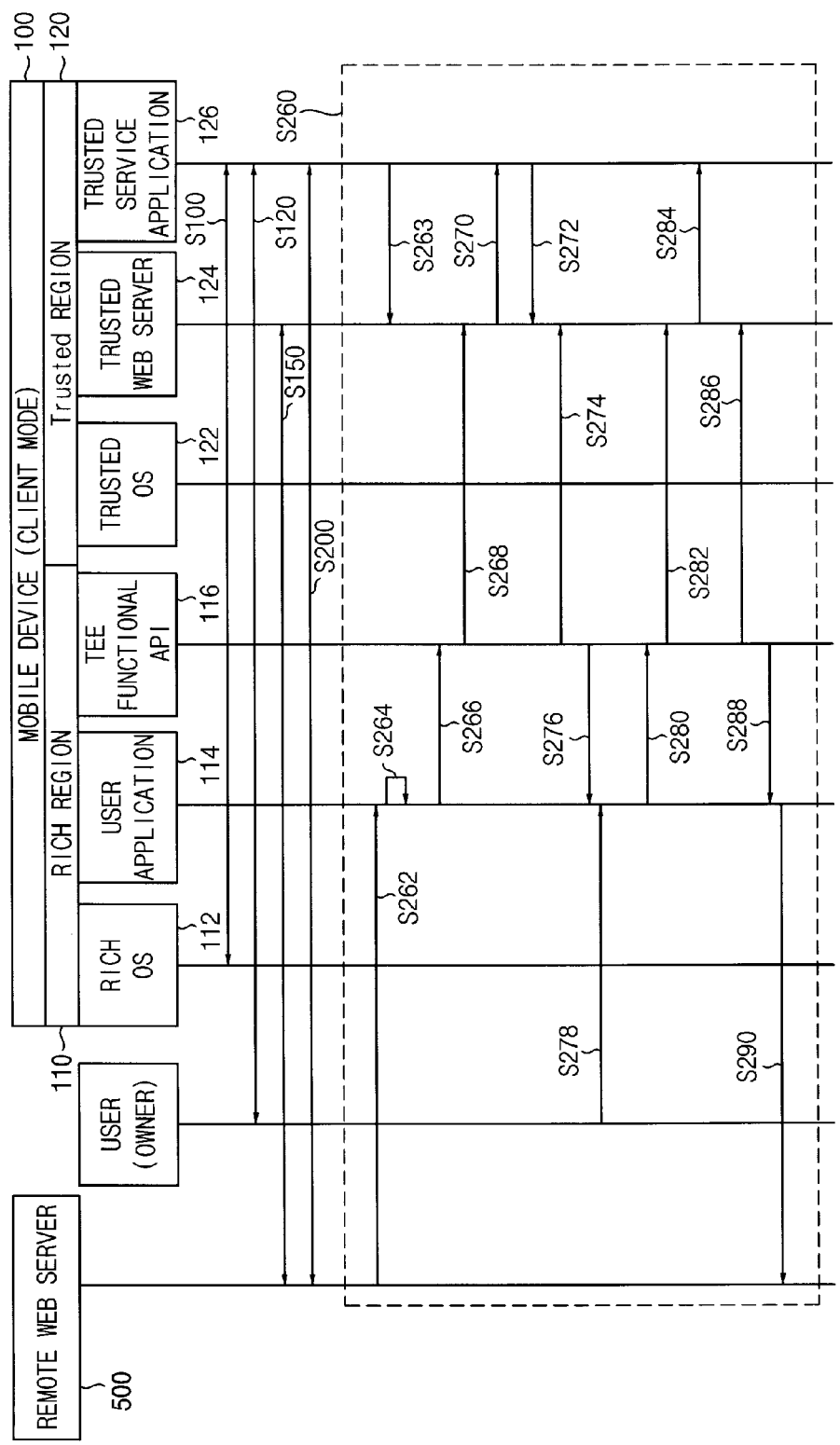
FIG. 13 is a message sequence diagram illustrating a process of downloading data provided from an external website to a trusted region of a mobile device according to an embodiment of the inventive concept.
Figure 14:
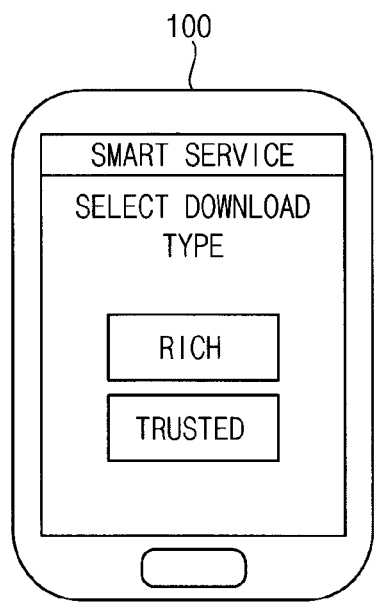
FIG. 14 is a diagram of a display screen showing a selection page of a download type according to an embodiment of the inventive concept.
Figure 15:
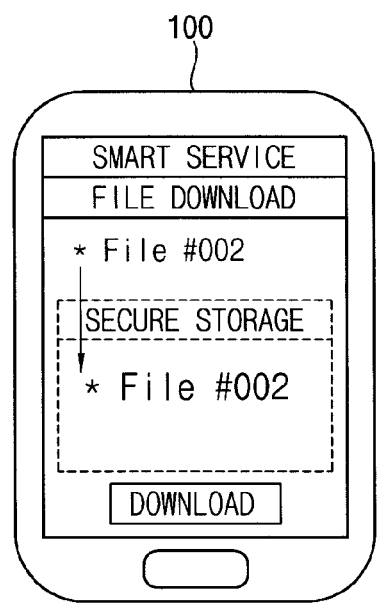
FIG. 15 is a diagram of a display screen showing a download execution page according to an embodiment of the inventive concept.

FIG. 13 is a message sequence diagram illustrating a process of downloading data provided from an external website to a trusted region of a mobile device according to an embodiment of the inventive concept. FIG. 14 is a diagram of a display screen showing a selection page of a download type according to an embodiment of the inventive concept. FIG. 15 is a diagram of a display screen showing a download execution page according to an embodiment of the inventive concept.

Referring to FIG. 13, sequences 5100, 5120, 5150 and 5200 are the same as described with reference to FIGS. 2 through 9. In a downloading process (S260), remote web server 500, which is authorized by forming the above-described security session, requests 'data download web page' to user application 114 (S262), and then user application 114 is executed to display a selection page of a download type (S264) on a screen of mobile device 100 as illustrated in FIG. 14. Where the user selects and touches 'TRUSTED' button to select a trusted download mode, user application 114 requests 'downloading web page in the trusted region' to TEE functional API 116 (S266). Where the user selects and touches 'RICH' button, the data files provided from remote web server 500 may be stored in rich region 110. TEE functional API 116 transfers 'request downloading web page' message to trusted web server 124 (S268) and trusted web server 124 requests the 'downloading web page' to trusted service application 126 (S270). trusted service application 126 is executed in response to the 'downloading web page' request to upload 'requested web page' to trusted web server 124 (S272). TEE functional API 116 acquires 'downloading web page' from trusted web server 124 (S274) and returns the 'downloading web page' to user application 114 (S276). User application 114 displays a download execution page as illustrated in FIG. 15. It the user touches 'DOWNLOAD' button (S278) on the display screen as illustrated in FIG. 15, and then user application 114 requests 'save the downloaded data file' to TEE functional API 116 (S280). TEE functional API 116 transfers 'request to save the downloaded data file' message to trusted web server 124 (S282) and trusted web server 124 requests 'save requested data file' to trusted service application 126 (S284). Trusted service application 126 is executed to encrypt the downloaded data file and store the encrypted data file in private data region 152 of secure storage hardware 150 in FIG. 1. TEE functional API 116 acquires 'storage finished' message from trusted web server 124 (S286) and returns 'storage finished' message to user application 114 (S288). User application 114 uploads the 'storage finished' message to remote web server 500 (S290).

Figure 16:
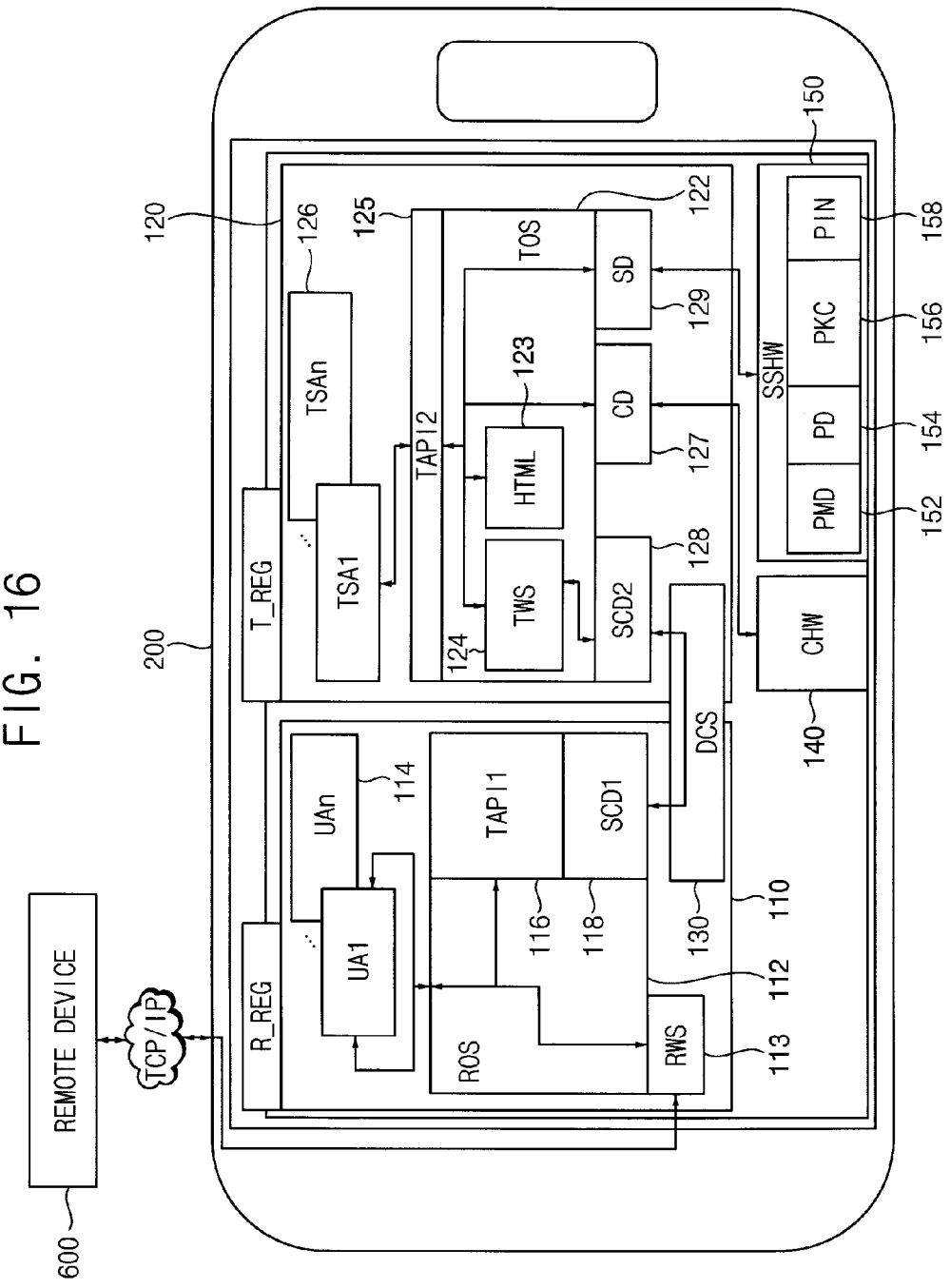
FIG. 16 is a diagram illustrating a mobile device configured to operate as a trusted mobile web server system according to an embodiment of the inventive concept.

FIG. 16 is a diagram illustrating a mobile device 200 configured to operate as a trusted mobile web server system according to an embodiment of the inventive concept.

Referring to FIG. 16, mobile device 200 is similar to mobile device 100 of FIG. 1 except that it further comprises a rich web server module 113. Accordingly, a repeated description of similar features will be omitted in order to avoid redundancy. In the embodiment of FIG. 16, remote device 600 may operate as both a client and a server.

Mobile device 200 comprises rich web server module 113 in rich region 110 and trusted web server module 124 in the trusted region 120. The web services of lower security level may be served through rich web server module 113 and the web services of higher security level may be served through trusted web server module 124.

Figure 17:
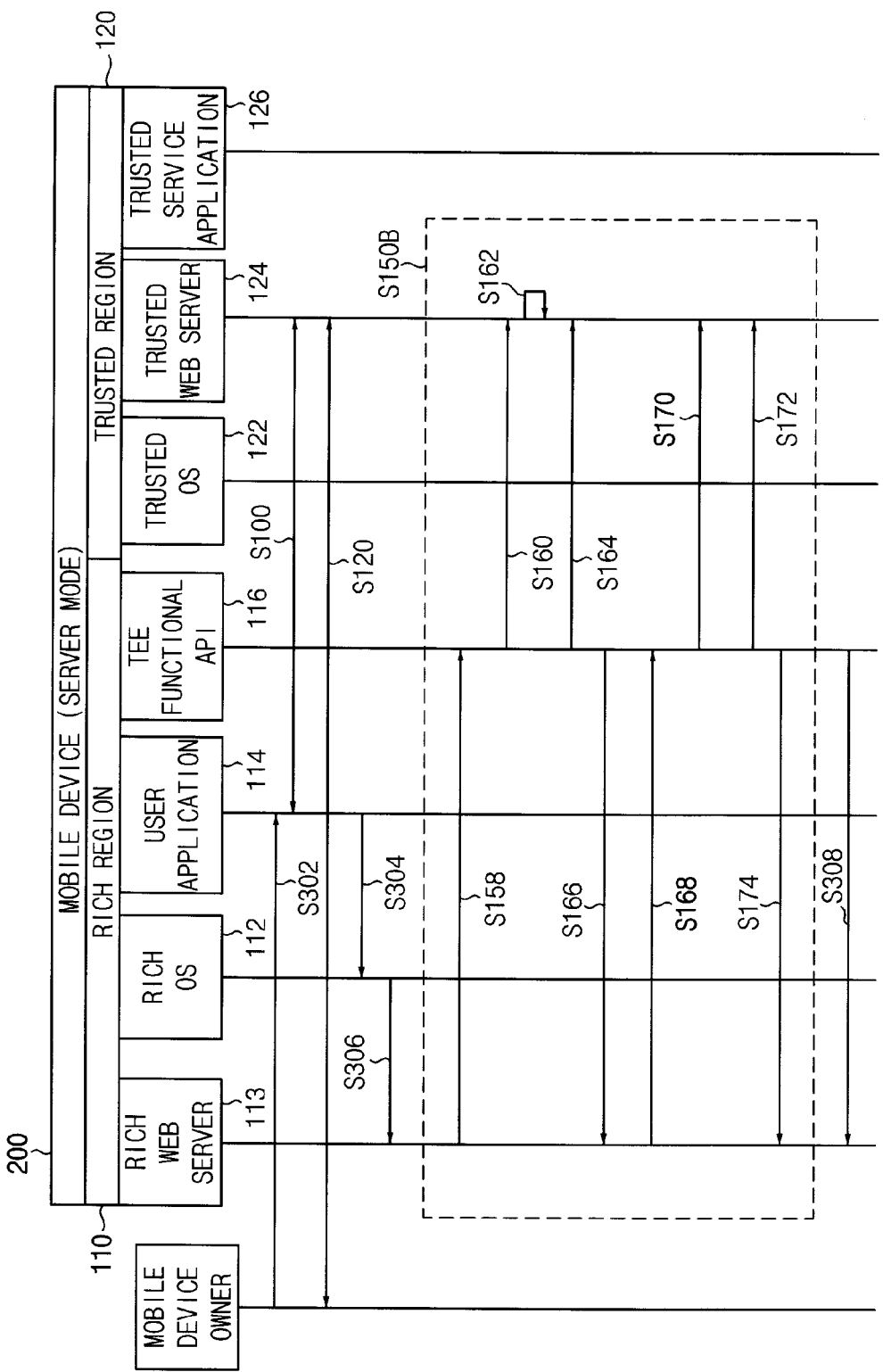
FIG. 17 is a message sequence diagram illustrating a process of initializing a user application and a trusted service application according to an embodiment of the inventive concept.

FIG. 17 is a message sequence diagram illustrating a process of initializing a user application and a trusted service application according to an embodiment of the inventive concept.

Referring to FIG. 17, the user of mobile device 200 may enable user application 114 (S302), for example, by touching a corresponding icon displayed on a touch pad of mobile device 200. Where user application 114 is enabled, the application certification negotiation (S100) and the trusted environment login scheme (S120) may be performed as described with reference to FIG. 2. User application 114 requests rich operating system 112 to enable rich web server 113 (S304) and then rich operating system 112 executes rich web server 113 (S306). Rich web server 113 performs the internal session negotiation (S150B) as described with reference to FIG. 5 to exchange the crypto key with trusted web server 124 in trusted region 120. The crypto key is exchanged between rich web server 113 and trusted web server 124 in FIG. 17 whereas the crypto key is exchanged between user application 114 and trusted web server 124 in FIG. 5. After the internal security session is formed between rich web server 113 and trusted web server 124, TEE functional API 116 uploads an application web page to rich web server 113 (S308).

In some embodiments, for safe data transfer, a security session may be formed using an internet protocol based on HTTP between a remote device 600, and trusted web server 124 in mobile device 200 operating in a server mode.

Figure 18:
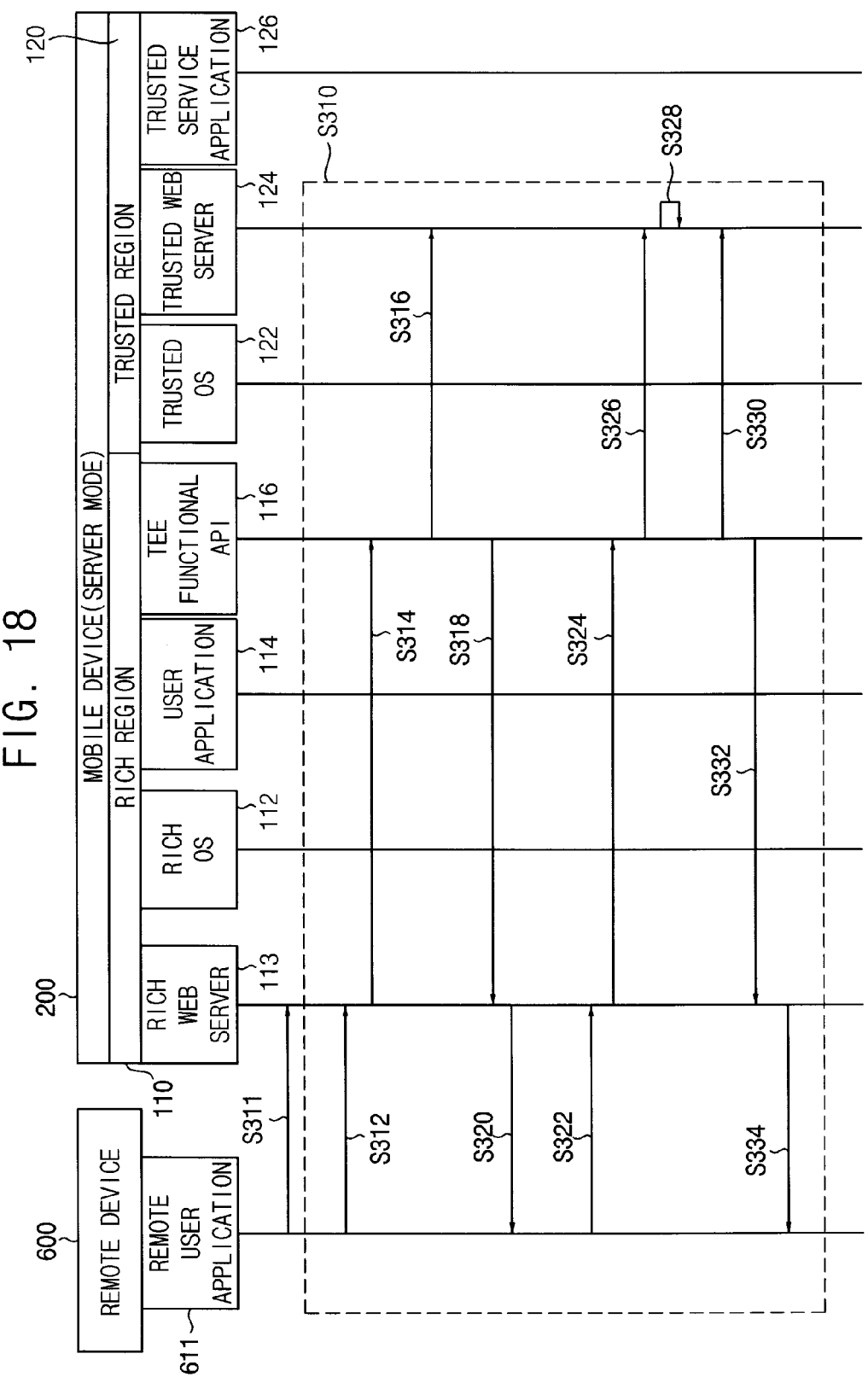
FIG. 18 is a message sequence diagram illustrating a process of forming a security session between a remote device and a trusted web server module of a mobile device according to an embodiment of the inventive concept.

FIG. 18 is a message sequence diagram illustrating a process of forming a security session between a remote device and a trusted web server of a mobile device according to an embodiment of the inventive concept.

Referring to FIG. 18, a security session forming process (S310) forms a TLS session between remote web server 600 and mobile device 200. A remote user application 611 of remote device 600 transfers 'access service web page' message to rich web server 113 (S311). Remote user application 611 transfers 'client hello' message to rich web server 113 (S312). Rich web server 113, in response to the 'client hello' message, transfers 'request server security' message to TEE functional API 116 (S314) and TEE function API 116 transfers 'server security' message to trusted web server 124 (S316).

TEE functional API 116 transfers 'server hello', 'server certificate', 'server key exchange', 'client certificate request' and 'server hello done' messages to rich web server 113 (S318). Rich web server 113 transfers 'server hello', 'server certificate', 'server key exchange', 'client certificate request' and 'server hello done' messages to remote user application 611 (S320). Remote user application 611 transfers 'client certificate', 'client key exchange', 'certificate verify', 'change cipher specification' and 'client finished' messages to rich web server 113 (S322), and rich web server 113 transfers the messages from remote user application 611 to TEE functional API 116 (S324). TEE functional API 116 transfers 'client security' message to trusted web server 124 (S326). Trusted web server 124 executes the 'client certificate', 'client key exchange', 'certificate verify', 'change cipher specification' and 'client finished' messages (S328) to store a crypto key in the public key certificate data region 156 of secure storage hardware 150. TEE functional API 116 acquires 'change cipher specification' and 'server finished' messages from trusted web server 124 (S300) and returns 'session finished' messages to rich web server 113 (S332). The security session forming process (S310) is finished when rich web server 113 transfers 'session finished' message to remote user application 611 (S334).

Figure 19:
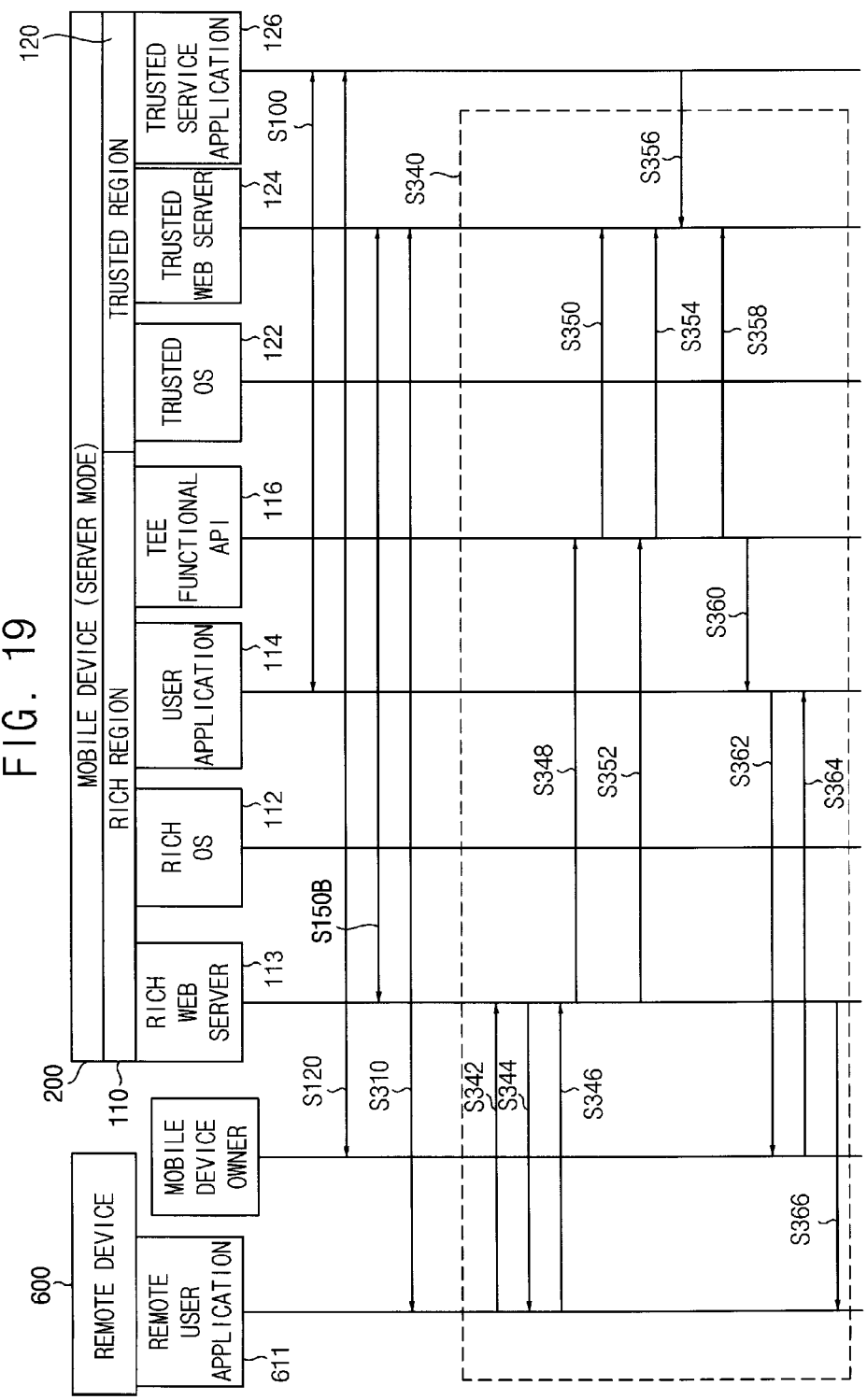
FIG. 19 is a message sequence diagram illustrating a process of registering a new remote device in a trusted region of a mobile device according to an embodiment of the inventive concept.

FIG. 19 is a message sequence diagram illustrating a process of registering a new remote device in a trusted region of a mobile device according to an embodiment of the inventive concept.

Referring to FIG. 19, sequences S100, S120, S150B and S310 are the same as described with reference to FIGS. 2, 17 and 18. In a registering process (S340), remote user application 611 of remote device 600, which is authorized by forming the above-described security session through sequences S100, S120, 5150B, S310, transfers 'enrolment page for new remote user' message to rich web server 113 (S342). Rich web server 113 opens an enrolment web page for new remote device 600 and transfers 'open enrolment web page' to remote user application 611 (S344). Remote user application 611 transfers 'new remote user profile data' message to rich web server 113 (S346) and rich web server 113 transfers 'request to enroll new remote user' message to TEE functional API 116 (S348). TEE functional API 16 transfers 'pre-enroll new remote user' message to trusted web server 124 (S350). Rich web server 113 transfers 'request manager web page' message to TEE functional API 116 (S352) and TEE functional API 116 transfers 'request manager web page' message to trusted web server 124 (S354). Trusted service application 126 transfers 'manager web page' message to trusted web server 124 (S356). TEE functional API 116 acquires 'manager web page' from trusted web server 124 (S358) and returns 'manager web page' to user application 114 (S360). The user application displays the manage web page (S362) on the display screen of mobile device 200. The user of mobile device 200 inputs a registration command on the displayed manager web page (S364) and then rich web server 113 transfers 'approval' message to remote user application 611 (S366).

Figure 20:
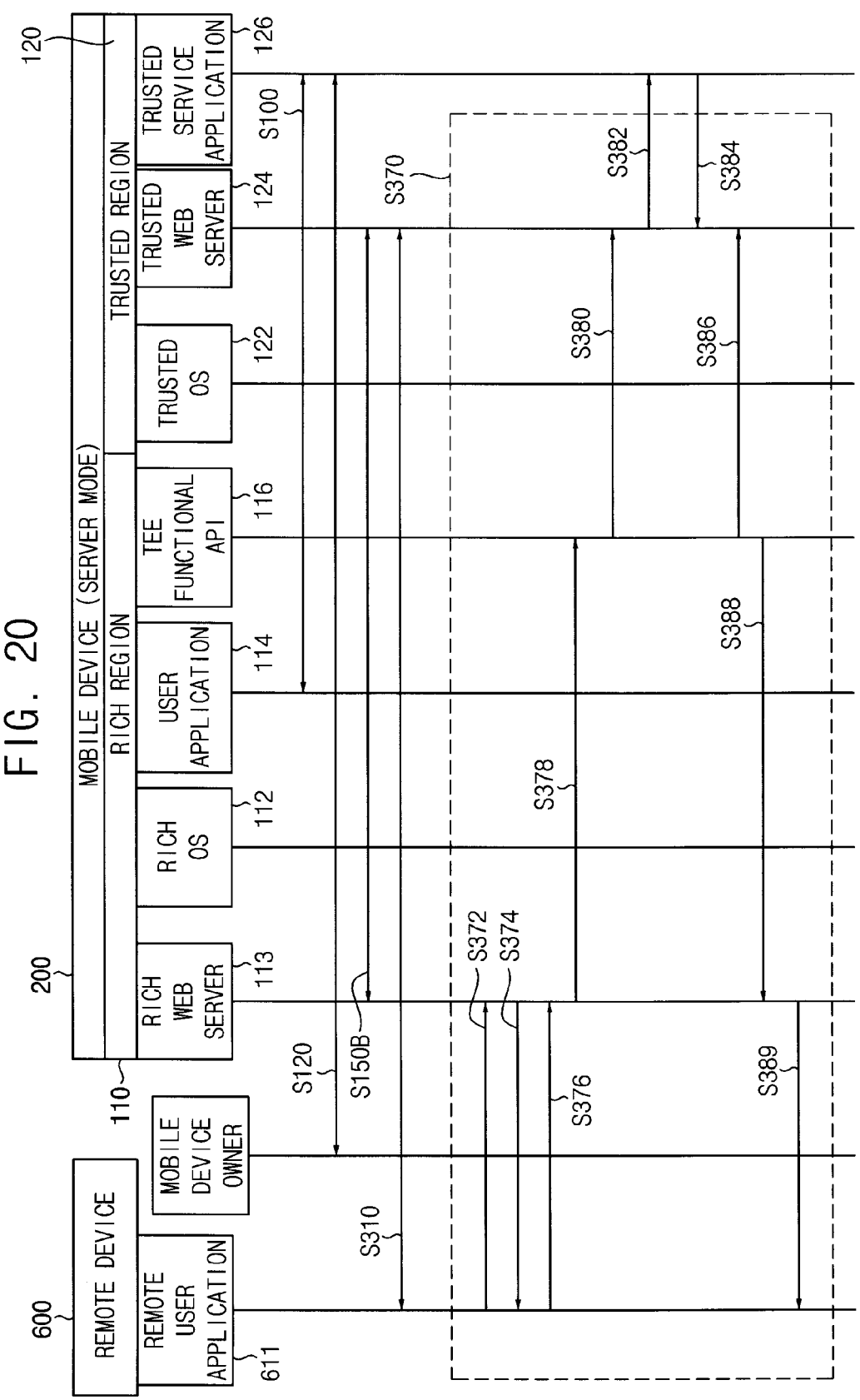
FIG. 20 is a message sequence diagram illustrating a process of performing an automatic login of a remote device using remote device information stored in a trusted region according to an embodiment of the inventive concept.

FIG. 20 is a message sequence diagram illustrating a process of performing an automatic login of a remote device using remote device information stored in a trusted region according to an embodiment of the inventive concept.

Referring to FIG. 20, sequences S100, S120, 5150B and S310 are the same as described with reference to FIGS. 2, 17 and 18. In a login process S370, remote user application 611 of remote device 600, which is authorized by forming the above-described security session through sequences S100, S120, 5150B, S310, transfers 'access login page' message to rich web server 113 (S372) and then rich web server 113 opens the login web page and transfers 'open remote login page' message to remote user application 611 (374). Remote user application 611 transfers 'ID/PW of remote user' message to rich web server 113 (S376) and the rich web server transfers 'request to verify ID/PW of remote user' message to TEE functional API 116 (S378). TEE functional API 116 transfers 'ID/PW of remote user' message to trusted web server 124 (S380) and trusted web server 124 transfers 'ID/PW of remote user' data to trusted service application 126 (S382). Trusted service application 126 is executed to verify the receive 'ID/PW of remote user' based on the stored data in secure storage hardware 150 in FIG. 16. TEE functional API 116 acquires 'verification result' message from trusted web server 124 (S386) and returns the 'verification result' message to rich web server 113 (S388). The login process (S370) is finished when rich web server 113 transfers 'login approval' message to remote user application 611 (S389).

FIG. 21 is a message sequence diagram illustrating a process of uploading data provided from a remote device to a trusted region of a mobile device according to an embodiment of the inventive concept.

Referring to FIG. 21, sequences S100, S120, S150B, S310 and S370 are the same as described with reference to FIGS. 2, 17, 18 and 20. In an upload process (S400), remote user application 611 of remote device 600, which is authorized by forming the above-described security session through sequences S100, S120, S150B, S310, transfers 'request data uploading web page' message to rich web server 113 (S402), and then rich web server 113 opens a data uploading web page and transfers 'open data uploading web page' message to remote user application 611 (S404). Remote user application 611 or a user of remote device 600 selects a trusted upload type (S405) and transfers 'request to upload file from remote to trusted region' message to rich web server 113 (S408). Rich web server 113 transfers 'upload requested file' message to TEE functional API 116 (S410) and TEE functional API 116 transfers 'request to upload file' message to trusted web server 124 (S412). Trusted web server 124 transfers the 'request to upload file' message to trusted service application 126 and trusted service application 126 is executed (S416) to store the provided file in secure storage hardware 150 in FIG. 16 and transfer 'result' message to trusted web server 124 (S418). TEE functional API 116 acquires 'result' message from trusted web server 124 (S420) and returns 'result' message to rich web server 113 (S422). The upload process (S400) is finished when rich web server 113 transfers 'upload result' message to remote user application 611 (S424).

FIG. 22 is a message sequence diagram illustrating a process of downloading data stored in a trusted region of a mobile device to a remote device according to an embodiment of the inventive concept.

Referring to FIG. 22, in a download process (S430), remote user application 611 of remote device 600, which is authorized by forming the above-described security session, transfers 'request data downloading web page' message to rich web server 113 (S432). Rich web server 113 opens a data downloading web page and transfers 'open data downloading web page' message to remote user application 611 (S434).

Remote user application 611 or a user of remote device 600 selects a trusted download type (S436) and transfers 'request downloadable file list in trusted region' message to rich web server 113 (S438). Rich web server 113 transfers 'request downloadable file list in trusted region' message to TEE functional API 116 (S440) and TEE functional API 116 transfers 'request downloadable file list in trusted region' message to trusted web server 124 (S442). The trusted web server requests the downloadable file list to trusted service application 126 (S444) and trusted service application 126 uploads the requested file list to trusted web server 124 (S446). TEE functional API 116 acquires 'requested file list' message from trusted web server 124 (S448) and returns 'requested file list' message to rich web server 113 (S450). The rich web server opens a file list web page' and transfers 'open file list web page' message to remote user application 611 (S452). User application 611 selects a file from the file list (S454) and transfers 'request selected file' message to rich web server 113 (S456). Rich web server 113 transfers 'request selected file' message to TEE functional API 116 (S458) and TEE functional API 116 transfers 'request selected file' message to trusted web server 124 (S460). The trusted web server requests the selected file to trusted service application 126 (S462) and trusted service application 126 uploads the requested file to trusted web server 124 (S464). TEE functional API 116 acquires 'requested file' message from trusted web server 124 (S466) and returns 'requested file' message to rich web server 113 (S468). The download process (S430) is finished when rich web server 113 'requested file' message to remote user application 113 (S469).

As indicated by the foregoing, a mobile device operating as a trusted mobile web client and a server system may include a trusted web server module operating in a trusted region to support a trusted region such that private information such as ID/PW, private pictures, private movies, secret documents, etc. may be conveniently and safely managed in the trusted region without being accessed undesirably. By forming the above-mentioned security session, the registering process and the login process may be performed automatically without the user's input operation though the keypad or the touchpad. The trusted service application and the user application may be linked through the typical internet protocol such as HTTP, and thus development of application programs may be performed efficiently. The above-described mobile devices and the associated methods can be used in various applications, such as mobile financial transactions, mobile shopping, mobile information search, and access to mobile contents, to name but a few.

The respective blocks or the assembly of the two or more blocks in FIGS. 1 and 16 may be implemented in a form of hardware, software or combination of hardware and software. The trusted mobile web client and server systems described above may be implemented based on software. In this case, the mobile device may be implemented with a computing system including a general purpose processor (GPP) and/or a special purpose processor (SPP) configured to execute programs for realizing the above described functions or operations.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims

What is claimed is:

1. A method of operating a mobile device, comprising:
   executing a trusted service application in a trusted operating system;
   executing a trusted web server module in the trusted operating system; and
   executing a user application in a rich operating system, the rich operating system being prohibited to access resources controlled by the trusted operating system, wherein the user application is configured to relay communication between a remote web server and the trusted web server module through a security session,
   wherein the trusted web server module is configured to transfer private information from the trusted service application in a trusted region to the user application in a rich region where the private information is generated by execution of the trusted service application, and
   wherein the trusted web server module is configured to link the user application and the trusted service application and the trusted web server module is configured to support data communication between the user application and the trusted service application using an internet protocol.

2. The method of claim 1, wherein the user application is configured to perform a user certificate procedure for a secure login by registering a user identification and a password in the trusted operating system through the trusted service application.

3. The method of claim 2, wherein the user application forms an external security session by exchanging a server-client crypto key with the remote web server and forms an internal security session by exchanging the server-client crypto key with the trusted web server module, and wherein the trusted web server module is configured to encrypt data to be uploaded to the remote web server using the server-client crypto key transferred from the remote web server.

4. The method of claim 3, wherein where the remote web server requests registration of a new user, the user application requests a user profile to the trusted web server module in an automatic registration mode, the trusted web server module provides an encrypted user profile in a form of a web page to the user application, and the user application uploads the encrypted user profile to the remote web server.

5. The method of claim 4, wherein where the remote web server transfers a login request to the user application, the user application provides uniform resource locator (URL) information to be accessed and requests user identification and password to the trusted web server module, the trusted web server module checks the URL information and provides encrypted user identification and password to the user application, and the user application uploads the encrypted user identification and password to the remote web server.

6. The method of claim 5, wherein where the remote web server transfers an upload request to the user application, the user application requests an uploadable file list to the trusted web server module in a trusted upload module and requests a selected file in the uploadable file list, the trusted web server module provides an encrypted selected file to the user application and the user application uploads the encrypted selected file to the remote web server.

7. The method of claim 5, wherein when the remote web server transfers a data download request to the user application, the user application request a downloading web page to the trusted web server module in a trusted download mode and provides a downloaded data file selected on the downloading web page to the trusted web server module, and the trusted web server module executes the trusted service application to encrypt the downloaded data file and store the encrypted data file in the trusted region.

8. A method of operating a mobile device, comprising:
executing a trusted service application in a trusted operating system;
executing a trusted web server module in the trusted operating system;
executing a user application in a rich operating system, the rich operating system being prohibited to access resources controlled by the trusted operating system; and
executing a rich web server module in the rich operating system, wherein the rich web server module is configured to relay communication between a remote device and the trusted web server module through a security session,
wherein the trusted web server module is configured to transfer private information from the trusted service application in a trusted region to the user application in a rich region where the private information is generated by execution of the trusted service application, and
wherein the trusted web server module is configured to link the user application and the trusted service application and the trusted web server module is configured to support data communication between the user application and the trusted service application using an internet protocol.

9. The method of claim 8, wherein the rich web server module is configured to perform a manager certificate procedure for a secure login by registering a user identification and a password in the trusted operating system through the trusted service application and an internal security session is formed by exchanging a crypto key between the rich web server module and the trusted web server module.

10. The method of claim 9, wherein the rich web server module relays a server-client crypto key to form an external security session between the remote device and the trusted web server module.

11. The method of claim 10, wherein where the remote device transfers a registration request to the rich web server module, the rich web server module receives a user profile from the remote device and provides the user profile to the trusted web server module, the trusted web server module requests a registration command through the user application linked to the trusted service application and the rich web server module transfers an approval message to the remote user application.

12. The method of claim 11, wherein where the remote device transfers a login request, the rich web server module relays a user identification and a password from the remote device to the trusted web server module, the trusted web server module provides a verification result of the user identification and the password to the rich web server module, and the rich web server module transfers a login approval message to the remote device.

13. The method of claim 12, wherein where the remote device transfers an upload request to the rich web server module, the rich web server module relays an upload file from the remote device to the trusted web server module, the web server module stores the upload file in the trusted region, and the rich web server module transfers an upload result message to the remote device.

14. The method of claim 12, wherein where the remote device transfers a download request to the rich web server module, the rich web server module relays a downloadable file list from the trusted web server module to the remote device, the rich web server module relays requested file information from the remote device to the trusted web server module, the trusted web server module provides a requested file to the rich web server module in response to the requested file information, and the rich web server module transfers the requested file to the remote device.

15. A mobile device, comprising:
a trusted region operated under a trusted operating system configured to execute a trusted service application, and further configured to execute a trusted web server module; and
a rich region operated under a rich operating system configured to execute a user application, the rich operating system being prohibited to access resources controlled by the trusted operating system, wherein the user application is configured to relay communication between a remote web server and the trusted web server module through a security session,
wherein the trusted web server module is configured to transfer private information from the trusted service application in the trusted region to the user application in the rich region where the private information is generated by execution of the trusted service application, and
wherein the trusted web server module is configured to link the user application and the trusted service application and the trusted web server module is configured to support data communication between the user application and the trusted service application using an internet protocol.

16. The mobile device of claim 15, wherein the rich operating system is further configured to execute a rich web server module, wherein the rich web server module is configured to relay communication between the remote device and the trusted web server module through the security session.

17. The mobile device of claim 16, wherein the rich web server module is configured to perform a manager certificate procedure for a secure login by registering a user identification and a password in the trusted operating system through the trusted service application and an internal security session is formed by exchanging a crypto key between the rich web server module and the trusted web server module.

18. The mobile device of claim 15, wherein the user application is configured to perform a user certificate procedure for a secure login by registering a user identification and a password in the trusted operating system through the trusted service application.

19. The mobile device of claim 18, wherein the user application forms an external security session by exchanging a server-client crypto key with the remote web server and forms an internal security session by exchanging the server-client crypto key with the trusted web server module, and wherein the trusted web server module is configured to encrypt data to be uploaded to the remote web server using the server-client crypto key transferred from the remote web server.

20. The mobile device of claim 16, wherein the rich web server module relays a server-client crypto key to form an external security session between the remote device and the trusted web server module.

* * * * *